US009494120B2

(12) United States Patent
Naganuma (10) Patent No.: US 9,494,120 B2
(45) Date of Patent: Nov. 15, 2016

(54) CHAINSAW HAVING VENTHOLES FOR VENTILATION

(71) Applicant: Hitachi Koki Co., Ltd., Tokyo (JP)

(72) Inventor: Kenji Naganuma, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 471 days.

(21) Appl. No.: 13/735,837

(22) Filed: Jan. 7, 2013

(65) Prior Publication Data

US 2013/0180504 A1    Jul. 18, 2013

(30) Foreign Application Priority Data

Jan. 13, 2012  (JP) ................................. 2012-005521

(51) Int. Cl.
    *F01P 1/06*    (2006.01)
    *F02M 69/00*    (2006.01)
    *B27B 17/00*    (2006.01)

(52) U.S. Cl.
    CPC .............. *F02M 69/00* (2013.01); *B27B 17/00* (2013.01)

(58) Field of Classification Search
    CPC ... F02M 35/1017; F02B 63/02; B27B 17/00; B27B 17/0008; F02F 1/04; F02F 1/065; A01G 3/085; A01G 3/086
    USPC .......... 123/41.31, 41.56, 195 C, 41.7, 41.61; 181/264; 30/381
    See application file for complete search history.

(56) References Cited

U.S. PATENT DOCUMENTS

| | | | | |
|---|---|---|---|---|
| 2,323,281 A | * | 6/1943 | De Pew ..................... | 123/41.61 |
| 3,115,125 A | * | 12/1963 | Spencer et al. ............ | 123/41.42 |
| 3,734,070 A | * | 5/1973 | Kobayashi et al. ....... | 123/41.31 |
| 4,370,855 A | * | 2/1983 | Tuggle ............................. | 60/317 |
| 4,773,365 A | * | 9/1988 | Nagashima ............... | 123/195 C |
| 5,018,492 A | | 5/1991 | Wolf et al. | |
| 5,065,708 A | * | 11/1991 | Wehle ..................... | F02B 63/02 |
| | | | | 123/184.61 |
| 5,243,939 A | * | 9/1993 | Viktorsson .......... | B27B 17/0033 |
| | | | | 123/198 E |

(Continued)

FOREIGN PATENT DOCUMENTS

| | | |
|---|---|---|
| JP | S54-117416 U | 8/1979 |
| JP | S62-173527 U | 11/1987 |

(Continued)

OTHER PUBLICATIONS

Japanese Patent Application No. 2012-005521, Notification of Reasons for Refusal (Office Action), dated Nov. 16, 2015, with English translation.

*Primary Examiner* — Hung Q Nguyen
*Assistant Examiner* — Josh Campbell
(74) *Attorney, Agent, or Firm* — Kilpatrick Townsend & Stockton LLP (57) ABSTRACT

A chainsaw includes: an engine unit; a fuel supplying device configured to supply fuel to the engine unit; and an engine chamber defining portion defining an engine chamber therein. The engine unit includes: a cylinder unit housing a piston therein; a crankshaft configured to be driven by the piston; and a crank case configured to support the cylinder unit and house the crankshaft therein. The cylinder unit is accommodated in the engine chamber. The engine chamber defining portion has a partitioning portion interposed between the cylinder unit and the fuel supplying device and is formed with a first engine chamber venthole and a second engine chamber venthole adjacent to the cylinder unit for achieving ventilation between the engine chamber and atmosphere.

7 Claims, 7 Drawing Sheets

(56) References Cited

U.S. PATENT DOCUMENTS

| | | | |
|---|---|---|---|
| 5,595,153 A * | 1/1997 | Hoppner et al. | 123/198 E |
| 5,992,375 A * | 11/1999 | Nagashima | F02B 63/02 123/311 |
| 6,378,467 B1 * | 4/2002 | Kobayashi et al. | 123/41.56 |
| D658,959 S * | 5/2012 | Landberg | D8/65 |
| 2001/0039736 A1 * | 11/2001 | Husges et al. | 30/276 |
| 2002/0088421 A1 * | 7/2002 | Radel | F02B 63/02 123/184.21 |
| 2005/0051127 A1 * | 3/2005 | Adam et al. | 123/185.3 |
| 2005/0155578 A1 * | 7/2005 | Ichise et al. | 123/431 |
| 2008/0000215 A1 * | 1/2008 | Duncan | 60/204 |
| 2010/0011597 A1 * | 1/2010 | Bo et al. | 30/381 |
| 2010/0122683 A1 * | 5/2010 | Kawana et al. | 123/195 C |
| 2010/0236082 A1 | 9/2010 | Naganuma et al. | |

FOREIGN PATENT DOCUMENTS

| | | |
|---|---|---|
| JP | H03-153301 A | 7/1991 |
| JP | 2010216394 A | 9/2010 |

* cited by examiner

RIGHT
FRONT ← → REAR
LEFT

RIGHT ←→ LEFT

FIG. 8

TOP
LEFT ←→ RIGHT
DOWN

CHAINSAW HAVING VENTHOLES FOR VENTILATION

CROSS REFERENCE TO RELATED APPLICATION

This application claims priority from Japanese Patent Application No. 2012-005521 filed Jan. 13, 2012. The entire content of the priority application is incorporated herein by reference.

TECHNICAL FIELD

The present invention relates to a chainsaw.

BACKGROUND

A conventional chainsaw is commonly provided with an engine for driving a saw chain. Japanese Patent Application No. 2010-216394 discloses one type of such chainsaw using gasoline as fuel, and a carburetor for supplying the fuel to the engine. The carburetor applies Bernoulli's principle by injecting liquid gasoline stored in its chamber into an air passage as a fine spray. The fuel and air mix in the air chamber, and this mixture is supplied to the engine.

SUMMARY

Since the engine generates heat, the chainsaw is provided with a fan for cooling the engine. The fan is driven by the engine and does not rotate when the engine is halted. Consequently, the fan cannot cool the engine in its halted state, and the engine temperature remains elevated. Under these circumstances, the carburetor connected to the engine is exposed to heat transmitted from the engine.

Since liquid gasoline has a boiling point within the range of 30 to 220 degrees Celsius, gasoline remaining in the chamber of the carburetor is sometimes vaporized when the carburetor reaches a temperature of 60 degrees or more due to the heat transmitted from the engine. Since carburetors work by spraying liquid gasoline, the fuel cannot be supplied properly when the gasoline is vaporized. Hence, when the operator halts the engine in this type of chainsaw while the engine is hot and subsequently attempts to restart the engine, the engine may not start properly.

In view of the foregoing, it is an object of the present invention to provide an engine-powered chainsaw that maintains a good starting performance by preventing the carburetor from rising to a high temperature.

In order to attain the above and other objects, the present invention provides a chainsaw including: an engine unit configured to generate a driving force; a fuel supplying device configured to supply fuel to the engine unit; and an engine chamber defining portion defining an engine chamber therein. The engine unit includes: a cylinder unit housing a piston therein; a crankshaft configured to be driven by the piston; and a crank case configured to support the cylinder unit and house the crankshaft therein. The engine chamber accommodates the cylinder unit therein, and the engine chamber defining portion having a partitioning portion interposed between the cylinder unit and the fuel supplying device. The engine chamber defining portion is formed with a first engine chamber venthole and a second engine chamber venthole adjacent to the cylinder unit for achieving ventilation between the engine chamber and atmosphere.

According to another aspect, the present invention provides a chainsaw including: an engine unit configured to generate a driving force; a fuel supplying device configured to supply fuel to the engine unit; and a fuel supplying device chamber defining portion defining a fuel supplying device chamber therein. The engine unit includes: a cylinder unit housing a piston therein; a crankshaft configured to be driven by the piston; and a crank case configured to support the cylinder unit and house the crankshaft therein. The fuel supplying device chamber accommodates the fuel supplying device therein. The fuel supplying device chamber defining portion includes a partitioning portion interposed between the cylinder unit and the fuel supplying device. The fuel supplying device chamber defining portion is formed with a first carburetor chamber venthole and a second carburetor chamber venthole adjacent to the fuel supplying device for achieving ventilation between the fuel supplying device chamber and atmosphere.

BRIEF DESCRIPTION OF THE DRAWINGS

The particular features and advantages of the invention as well as other objects will become apparent from the following description taken in connection with the accompanying drawings, in which.

DETAILED DESCRIPTION

A chainsaw 1 according to an embodiment of the present invention will be described while referring to FIGS. 1 through 10.

Figure 1:
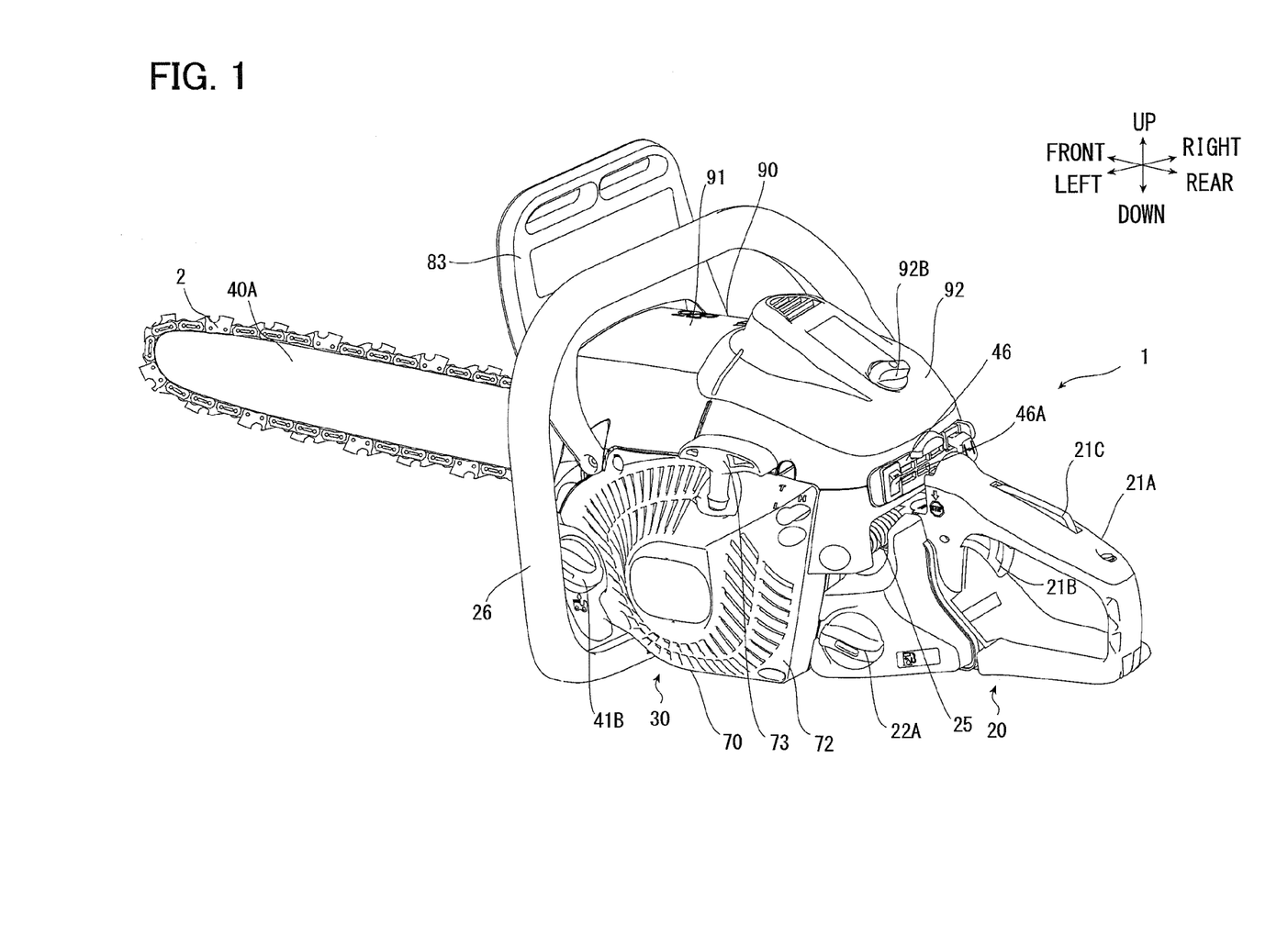
FIG. 1 is a perspective view of a chainsaw according to an embodiment of the present invention.
Figure 2:
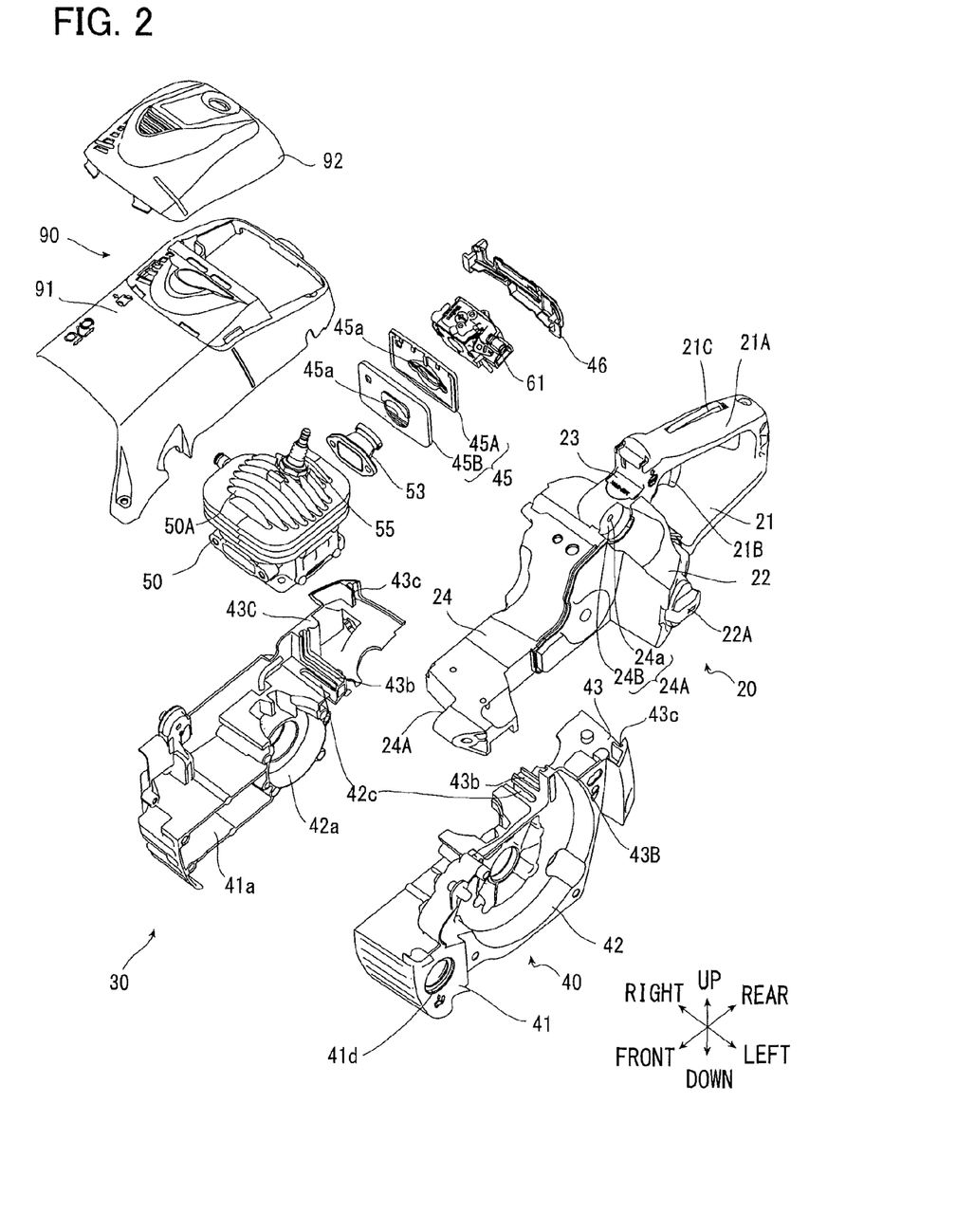
FIG. 2 is an exploded perspective view of essential portions of the chainsaw according to the embodiment.

The chainsaw 1 shown in FIG. 1 is gasoline-driven and primarily includes a frame section 20 and an engine section 30, as shown in FIG. 2 in greater detail.

The engine section 30 includes a chain guide 40A around which a saw chain 2 is mounted. As shown in FIG. 1, the saw chain 2 forms a loop around the chain guide 40A.

Hereinafter, a direction in which the chain guide 40A is elongated will be defines as a front-rear direction of the chainsaw 1, with the saw chain 2 extending forward from the engine section 30. Further, a direction orthogonal to the front-rear direction in which a support unit 24 described later (see FIG. 2) opposes the engine section 30 is defined as a vertical direction, with the direction from the support unit 24 to the engine section 30 defined as upward; and the direction orthogonal to both the front-rear and vertical directions is defined as the left-right direction of the chainsaw 1.

The frame section 20 shown in FIG. 2 is primarily formed of a resin material and includes a main handle part 21, a tank part 22, and the support part 24.

The main handle part 21 is positioned on a rearmost end of the frame section 20 and is generally annular shaped when viewed from its left or right side. The main handle part 21 includes a grip part 21A defining the upper portion thereof, a trigger 21B disposed on a front end of the grip part 21A, and a lock lever 21C provided on top of the grip part 21A. The grip part 21A constitutes a portion of the annular-shaped frame section 20 that extends in the front-rear direction. The trigger 21B is used to operate a throttle valve 61A described later through a mechanical linkage (not shown). The lock lever 21C protrudes upward from the top of the grip part 21A. The grip part 21A in this example is configured to be operated primarily with a right hand of an operator. The trigger 21B can only be operated while the lock lever 21C is pressed inward.

Figure 3:
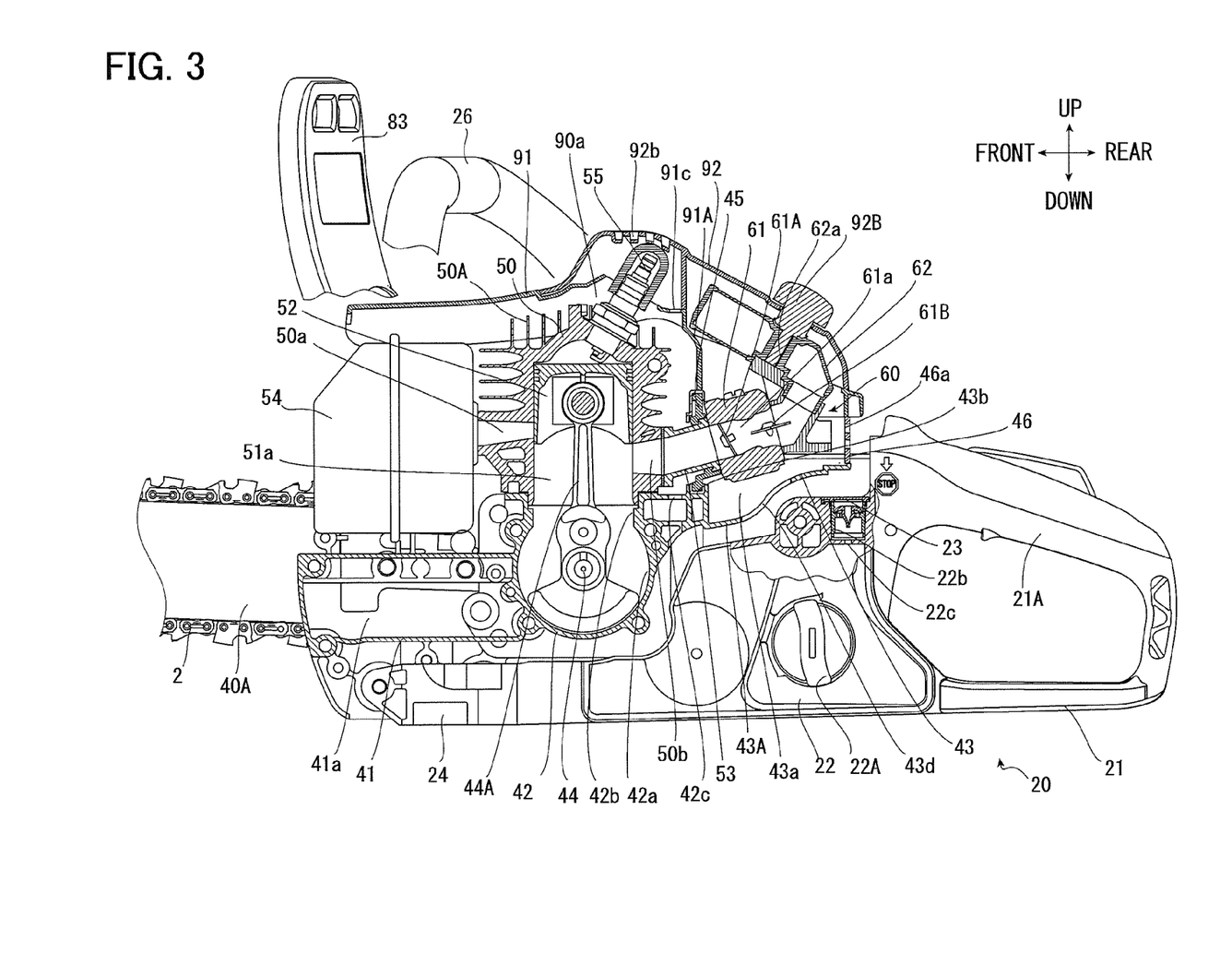
FIG. 3 is a cross-sectional side view of relevant parts of the chainsaw according to the embodiment.

The tank part 22 is provided in front of the main handle part 21 and is formed with a hollow interior for holding fuel, specifically gasoline. A fuel inlet (not shown) is formed in a left side surface of the tank part 22, and a cap 22A covers the fuel inlet. As shown in FIG. 3, a recess 22b is formed in an upper portion of the tank part 22 on the front side of the grip part 21A. The recess 22b is open on the top. A through-hole 22c is formed in a bottom wall defining the recess 22b for providing communication between the tank part 22 and the recess 22b (see FIGS. 3 and 4).

Figure 4:
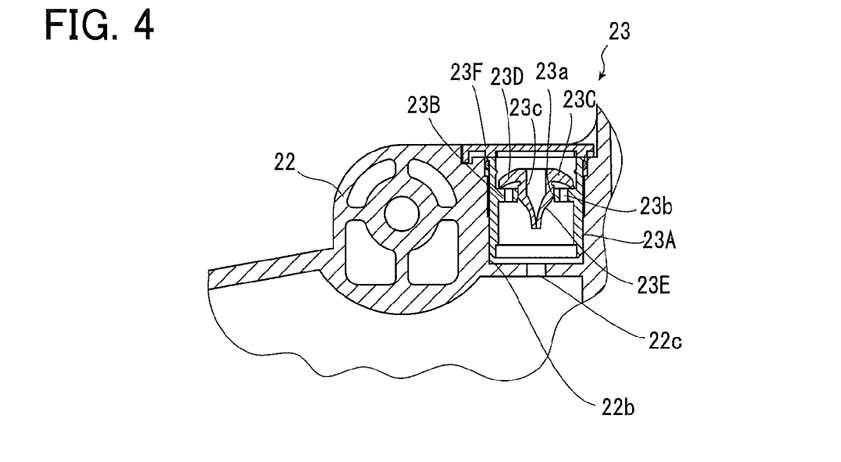
FIG. 4 is a partial cross-sectional view showing an area in the vicinity of a gasoline tank valve unit of the chainsaw according to the embodiment.

As shown in FIGS. 3 and 4, a gasoline tank valve unit 23 is provided in the tank part 22. The gasoline tank valve unit 23 is disposed inside the recess 22b and covers the top of the same. As shown in FIG. 4, the gasoline tank valve unit 23 is primarily configured of a cylindrical part 23A, a valve member 23C, and a cap 23F.

The cylindrical part 23A is formed as a hollow cylinder with its axis oriented in the vertical direction and is provided with a partitioning plate 23B that vertically partitions an internal space of the cylinder into two spaces. Specifically, the partitioning plate 23B is provided slightly above the vertical center of the cylindrical part 23A. A through-hole 23a is formed in the center of the partitioning plate 23B, penetrating the partitioning plate 23B vertically. A plurality of air holes 23b having a smaller diameter than the through-hole 23a is formed around the periphery of the through-hole 23a.

The valve member 23C is formed of a soft rubber material and is configured from an umbrella-like flange part 23D, and a trunk part 23E extending downward from the center of the flange part 23D. The trunk part 23E tapers toward its bottom end. The valve member 23C is mounted on the cylindrical part 23A by inserting the trunk part 23E through the through-hole 23a so that the flange part 23D covers the top surface of the partitioning plate 23B. A venthole 23c is formed in the valve member 23C from the top surface of the flange part 23D to the bottom end of the trunk part 23E.

Since the bottom opening of the venthole 23c is formed in the tapered lower end of the trunk part 23E, a difference in pressure above and below the partitioning plate 23B determines whether the bottom opening in the venthole 23c is open or closed. When the pressure in the gasoline tank valve unit 23 below the partitioning plate 23B is greater than the pressure above the partitioning plate 23B, the bottom opening of the venthole 23c is closed, preventing communication between the spaces above and below the partitioning plate 23B through the venthole 23c. However, when the pressure below the partitioning plate 23B is less than the pressure above, the bottom opening of the venthole 23c is open, allowing communication between the spaces above and below the partitioning plate 23B.

The flange part 23D is configured to cover the air holes 23b when the valve member 23C is mounted in the through-hole 23a. Therefore, the flange part 23D blocks the air holes 23b when the pressure below the partitioning plate 23B is less than the pressure above, closing the air holes 23b. However, when the pressure below the partitioning plate 23B is greater than the pressure above, the flange part 23D curls upward, allowing communication through the air holes 23b. The flange part 23D also covers the air holes 23b when the pressure below the partitioning plate 23B is equal to the pressure above, closing the air holes 23b.

With the valve member 23C mounted in the cylindrical part 23A, the cap 23F is assembled on the tank part 22 so as to cover the top of the valve member 23C. A feed pipe (not shown) is also connected to the tank part 22 and to a carburetor 61 described later for supplying gasoline from the tank part 22 to the carburetor 61.

As shown in FIG. 2, the support unit 24 primarily extends forward from the tank part 22. The support unit 24 includes a plurality of spring mounting units 24A for supporting the engine section 30 through springs 25 (see FIG. 1), and a front handle 26 (also see FIG. 1). Each of the spring mounting units 24A has a seat 24B for receiving the corresponding spring 25, and a screw hole 24a through which a screw is threaded to mount the spring 25 in the seat 24B. More specifically, the spring mounting units 24A include one spring mounting unit 24A disposed on the front end of the support unit 24 such that its seat (not shown) faces toward the right, and another spring mounting unit 24A disposed on the front side of the gasoline tank valve unit 23 with the seat 24B facing toward the left.

One end of the front handle 26 on the left side is fixed to the front end of the support unit 24 by screws inserted into the bottom surface of the support unit 24. From this point, the front handle 26 extends leftward, then upward along the left side of the support unit 24, rightward over the top of the support unit 24, and downward along the right side of the support unit 24. The end of the front handle 26 on the right side is mounted on the right surface of the support unit 24 at the rear end thereof. A handle-side spring mounting unit (not shown) having a structure similar to the spring mounting unit 24A is provided on the portion of the front handle 26 positioned on the right side of the support unit 24. This handle-side spring mounting unit is configured with a seat (not shown) facing leftward.

The engine section 30 is primarily configured of an engine case 40, a cylinder unit 50, a carburetor unit 60, a flywheel unit 70 (see FIG. 6), a clutch unit 80 (see FIG. 6), and a housing 90.

The engine case 40 is formed of two left and right casting halves integrated with a gasket interposed therebetween. Formed in the engine case 40, in order from front to rear, are an oil chamber part 41 having an internal oil chamber 41a defined therein, a crankcase part 42 having a crank chamber 42a defined therein, and a carburetor accommodating part 43 having an carburetor chamber 43a defined therein. The carburetor chamber 43a opens upward and functions to accommodate the carburetor unit 60 therein.

The chain guide 40A (see FIG. 1) is provided on a portion of the engine case 40 positioned outside the internal oil chamber 41a on the right side surface of the oil chamber part 41 and protrudes forward therefrom. The chain guide 40A is fixed by screws to a chain guide retaining part 40B (see FIG. 5) provided on the engine case 40. The chain guide 40A can pivot relative to the engine case 40 when the screws are loosened.

A pump mechanism (not shown) is provided on the right wall of the oil chamber part 41 for dripping oil from the internal oil chamber 41a onto the saw chain 2. An intake 41b (see FIG. 7) is formed in the right wall of the oil chamber part 41 for drawing air into the internal oil chamber 41a as oil is dripped by the pump mechanism.

Figure 7:
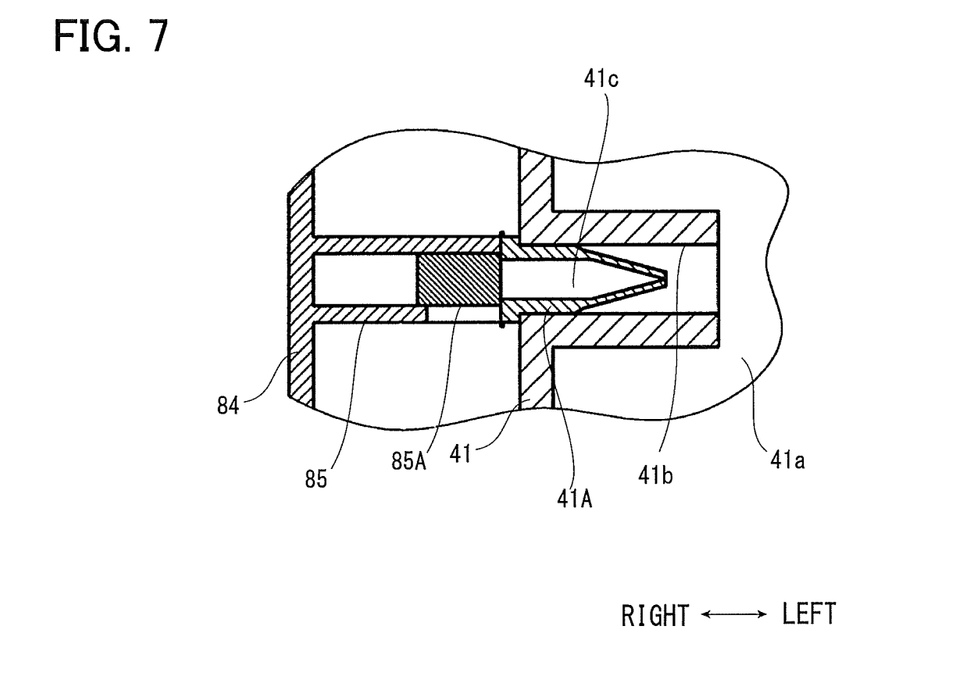
FIG. 7 is a partially enlarged cross-sectional view around a bush of the chainsaw according to the embodiment.

A rubber bushing 41A is mounted in the intake 41b. The rubber bushing 41A tapers toward its end nearest the internal oil chamber 41a. A through-hole 41c is formed in the rubber bushing 41A and is open in the tapered end of the same to allow communication between the interior and exterior of the internal oil chamber 41a. However, the end of the through-hole 41c on the internal oil chamber 41a side is maintained in a closed state. Accordingly, air can flow into the internal oil chamber 41a through the through-hole 41c only when the pressure in the internal oil chamber 41a drops below atmospheric pressure.

A cover 84 formed of a resin material is mounted on the right side surface of the oil chamber part 41 for covering the pump mechanism (not shown) mentioned above. As shown in FIG. 7, a cylindrical pressing part 85 is provided on the oil chamber part 41 side of the cover 84. A hollowed space in the pressing part 85 is oriented coaxially with the intake 41b. The pressing part 85 presses against the rubber bushing 41A when the cover 84 is mounted on the engine case 40, preventing the rubber bushing 41A from coming out of the intake 41b. A porous filter 85A is disposed inside the hollowed out portion of the pressing part 85 to prevent the through-hole 41c from becoming clogged with dust and other foreign matter.

An oil fill hole 41d is formed in the left wall of the oil chamber part 41 for filling oil into the internal oil chamber 41a. A cap 41B (see FIG. 1) is provided in the oil fill hole 41d.

As shown in FIG. 2, a through-hole is formed in each of the left and right walls of the crankcase part 42 for receiving a crankshaft 44 (see FIG. 3). The crankshaft 44 is rotatably supported in the crankcase part 42 by mounting the crankshaft 44 oriented in the left-right direction in bearings (not shown) provided in the through-holes. An opening 42b is formed in the top of the crankcase part 42 (see FIG. 5) and the cylinder unit 50 (see FIG. 2) is mounted over the periphery of the opening 42b. As shown in FIG. 3, the crankshaft 44 is connected to a conrod (connecting rod) 44A inside the crank chamber 42a. The conrod 44A is inserted through the opening 42b formed in the top of the crankcase part 42 and is connected to a piston 52 described later.

Figure 5:
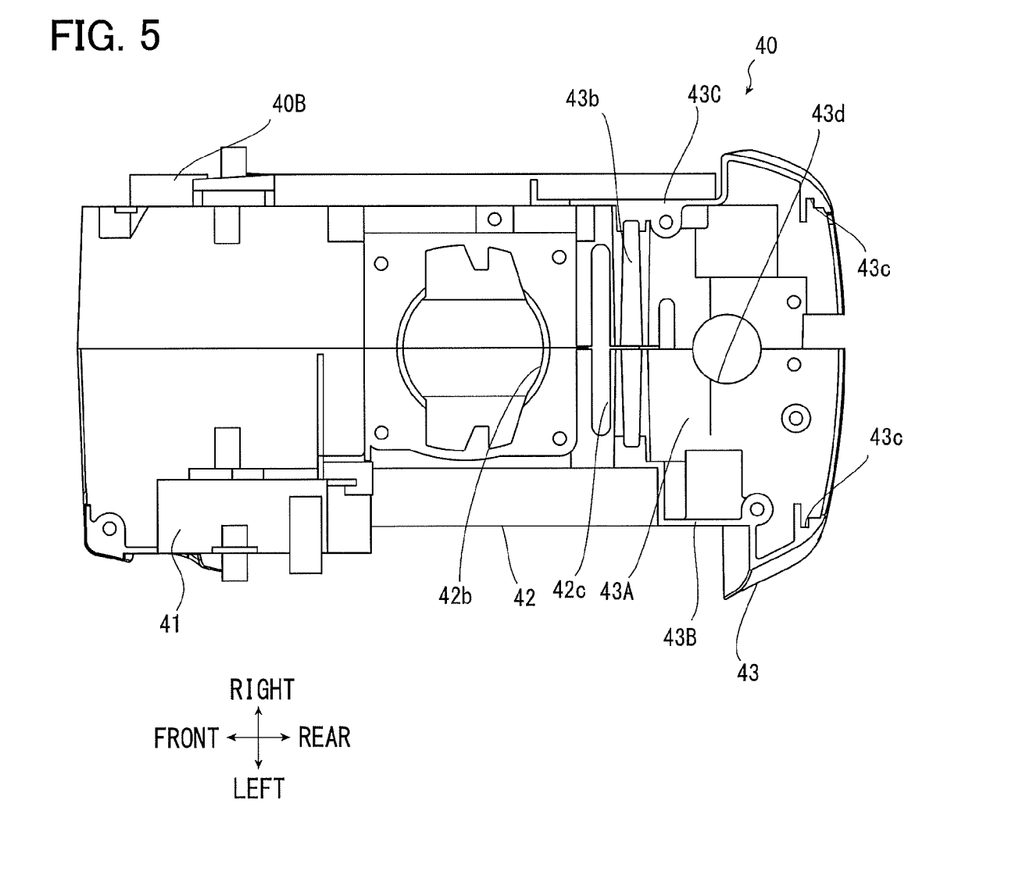
FIG. 5 is a plan view of an engine case portion of the chainsaw according to the embodiment.

As shown in FIGS. 3 and 5, a second engine chamber venthole 42c is formed in the crankcase part 42, penetrating the crankcase part 42 vertically on the rear side of the crank chamber 42a. The second engine chamber venthole 42c is positioned so that its opening on the bottom side confronts the top surface of the tank part 22 when the engine case 40 is mounted on the frame section 20.

As shown in FIG. 5, the carburetor accommodating part 43 is positioned to the rear of the second engine chamber venthole 42c. The carburetor accommodating part 43 includes a bottom wall 43A, and a left wall 43B and a right wall 43C that are erected upward from the respective left and right edges of the bottom wall 43A and elongated in the front-rear direction. The carburetor chamber 43a mentioned above is defined by the bottom wall 43A, left wall 43B, and right wall 43C, as well as a shielding plate 45 and a control panel 46 described later.

As shown in FIGS. 2 and 5, a front-side groove 43b is formed in the top surface of the bottom wall 43A near the second engine chamber venthole 42c and the front ends of the left wall 43B and right wall 43C and is positioned between the left wall 43B and right wall 43C. As shown in FIG. 3, the shielding plate 45 is inserted into the front-side groove 43b for separating the upper space of the engine case 40 from the carburetor chamber 43a.

As shown in FIG. 2, the shielding plate 45 is configured of a plate member 45A formed of a resin material, and a rubber sheet 45B covering the plate member 45A. A through-hole 45a is formed in the center of each of the plate member 45A and rubber sheet 45B for receiving an intake pipe 53 described later.

As shown in FIGS. 2 and 5, rear-side grooves 43c are formed in the rearmost edge of the carburetor accommodating part 43, with one formed in a portion of each of the left wall 43B and right wall 43C on the inside of the carburetor chamber 43a. As shown in FIG. 3, the control panel 46 is mounted in the pair of rear-side grooves 43c.

Figure 8:
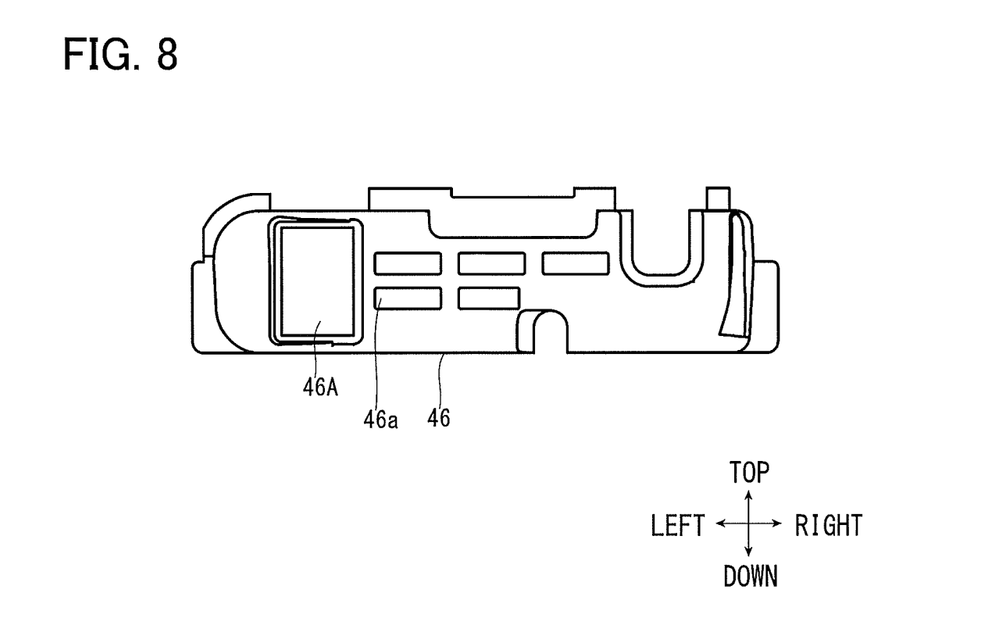
FIG. 8 is a plan view of an operation panel of the chainsaw according to the embodiment.

As shown in FIG. 8, the control panel 46 includes a switch 46A and second carburetor chamber ventholes 46a. The switch 46A is provided for controlling power supply to a spark plug 55 described later, and the second carburetor chamber ventholes 46a is formed in the control panel 46A to allow communication between the interior and exterior of the carburetor chamber 43a when the control panel 46 is mounted in the rear-side grooves 43c.

As shown in FIG. 5, the carburetor accommodating part 43 is also formed with a first carburetor chamber venthole 43d that penetrates the carburetor chamber 43a vertically. As shown in FIG. 3, the first carburetor chamber venthole 43d is formed in a region of the bottom wall 43A positioned above the top surface of the tank part 22 and is not directly visible on the outside of the chainsaw 1.

As shown in FIG. 3, the cylinder unit 50 is fixed to the engine case 40 on the periphery of the opening 42b formed in the crankcase part 42, with a gasket interposed therebetween. A cylinder chamber 51a is formed inside the cylinder unit 50. The cylinder chamber 51a extends vertically and communicates with the opening 42b when the cylinder unit 50 is mounted on the engine case 40. The piston 52 is inserted inside the cylinder chamber 51a. The piston 52 is joined to the conrod 44A with a pin and is capable of moving vertically inside the cylinder chamber 51a.

An exhaust port 50a is formed in the front side of the cylinder unit 50. The exhaust port 50a is positioned at a position substantially vertically center of the cylinder chamber 51a and allows communication between the cylinder chamber 51a and the exterior of the cylinder unit 50. A muffler 54 is connected to the exhaust port 50a. An intake port 50b is formed in the rear side of the cylinder unit 50. The intake port 50b is positioned lower than the exhaust port 50a and provides communication between the cylinder chamber 51a and the exterior of the cylinder unit 50. The intake pipe 53 is connected to the intake port 50b. The intake pipe 53 is cylindrical in shape and protrudes through the through-hole 45a of the shielding plate 45 into the carburetor chamber 43a.

A plurality of heat dissipating fins 50A is provided around an outer periphery of the cylinder unit 50 and particularly on the top of the cylinder unit 50. The spark plug 55 is also mounted in the top of the cylinder unit 50.

The carburetor unit 60 is primarily configured of the carburetor 61, and an air intake 62. As shown in FIG. 3, the carburetor 61 is connected to the intake pipe 53 and interposed between the intake pipe 53 and air intake 62. An air passage 61a is formed inside the carburetor 61 and communicates with the interior of the intake pipe 53. A throttle valve 61A and a choke valve 61B are disposed inside the air passage 61a at positions near the intake pipe 53 side and the air intake 62 side, respectively. The throttle valve 61A and choke valve 61B function to control the flow of fluid (fuel-air mixture) into the intake pipe 53. Although not shown in the drawings, the carburetor 61 is also provided with a chamber connected to the tank part 22 by a feed pipe, and a nozzle for injecting liquid gasoline stored in the chamber between the throttle valve 61A and choke valve 61B in the air passage 61a.

The air intake 62 is provided above the carburetor 61 and is connected to the carburetor 61 at a side opposite to the intake pipe 53 side. The air intake 62 includes an air filter (not shown) and is capable of feeding air through the air filter in order to supply filtered air into the air passage 61a of the carburetor 61. A screw hole 62a is formed in the air intake 62 for fixing the air intake 62 to a cleaner cover 92 described later.

Figure 6:
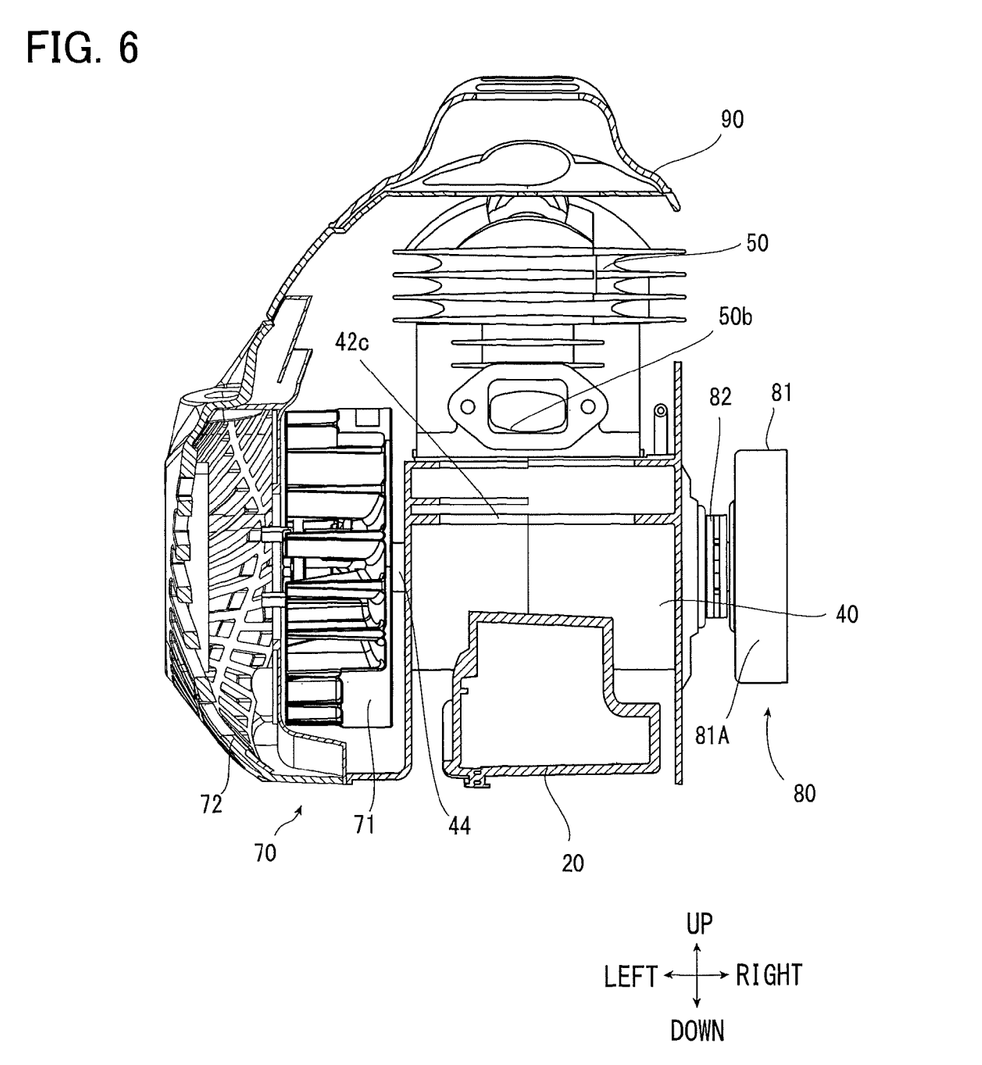
FIG. 6 is a cross-sectional view of relevant parts of the chainsaw according to the embodiment as viewed from its rear side.

As shown in FIG. 6, the flywheel unit 70 is disposed on the left side of the engine case 40 and primarily includes a fan 71, and a cover 72. The fan 71 is a metal centrifugal fan and is connected to the left end of the crankshaft 44 so as to rotate integrally and coaxially with the crankshaft 44. Since the fan 71 is formed of a heavy metal material, the fan 71 also functions as a flywheel for the crankshaft 44. A magnet (not shown) is disposed on a radially outer peripheral surface of the fan 71. A coil (not shown) is disposed at a position adjacent to the outer peripheral surface of the fan 71 and is connected to the spark plug 55 (see FIG. 3). Therefore, a current is supplied to the spark plug 55 in each rotation of the fan 71, causing the spark plug 55 to fire.

An ignition coil (not shown) for starting the engine is also provided in the flywheel unit 70. As shown in FIG. 1, a starter handle 73 is provided on the cover 72 for starting the ignition coil.

As shown in FIG. 6, the clutch unit 80 is primarily configured of a centrifugal clutch 81, and a sprocket 82. The centrifugal clutch 81 is disposed on the right end of the crankshaft 44. The centrifugal clutch 81 is primarily configured of a drum 81A mounted on the crankshaft 44 so as to rotate concentrically to the same, and clutch weights (not shown) built into the drum 81A for rotating together with and concentric to the crankshaft 44. When the crankshaft 44 rotates at a high speed, the weights in the centrifugal clutch 81 shift radially outward due to the centrifugal force and contact the drum 81A, causing the drum 81A to rotate together with and concentric to the crankshaft 44.

The sprocket 82 is mounted on the drum 81A so as to rotate together with and concentric to the same. The saw chain 2 (see FIG. 1) is wrapped around and meshed with the sprocket 82. The rotation of the sprocket 82 drives the saw chain 2.

A brake mechanism (not shown) is mounted on the clutch unit 80. The brake mechanism is connected to a hand guard 83 provided on the front side of the front handle 26, as shown in FIG. 1. When the hand guard 83 is pressed forward (i.e., when the front of the chainsaw 1 rotates upward about the grip part 21A held in the operator's right hand until the hand guard 83 contacts the left hand of the operator holding the front handle 26), the brake mechanism acts to halt rotation of the drum 81A.

As shown in FIG. 1, the housing 90 is primarily configured of a cylinder cover 91 and a cleaner cover 92. As shown in FIG. 3, the cylinder cover 91 has a front end positioned above the muffler 54, and a rear end contacting the top edge of the control panel 46. The cylinder cover 91 is configured to accommodate the cylinder unit 50 and carburetor unit 60. As shown in FIG. 3, the cylinder cover 91 is formed with a partitioning plate 91A on its lower surface that extends downward to the shielding plate 45. The partitioning plate 91A is in contact with the shielding plate 45 from upward thereof, and, together with the shielding plate 45, serves to define spaces frontward and rearward of the shielding plate 45. Specifically, the frontward space serves as an engine chamber 90a for accommodating the cylinder unit 50 therein, which is defined by the cylinder cover 91 (partitioning plate 91A), engine case 40, and shielding plate 45. The cylinder cover 91 (partitioning plate 91A) defining the engine chamber 90a, engine case 40, and shielding plate 45 correspond to a claimed engine chamber defining portion. Further, the rearward space serves as the carburetor chamber 43a, which is defined by the bottom wall 43A, left wall 43B, and right wall 43C, the cylinder cover 91 (partitioning plate 91A), the shielding plate 45, and the control panel 46. The bottom wall 43A, left wall 43B, right wall 43C, the cylinder cover 91 (partitioning plate 91A), the shielding plate 45, and the control panel 46 correspond to a claimed fuel supplying device chamber defining portion.

Figure 9:
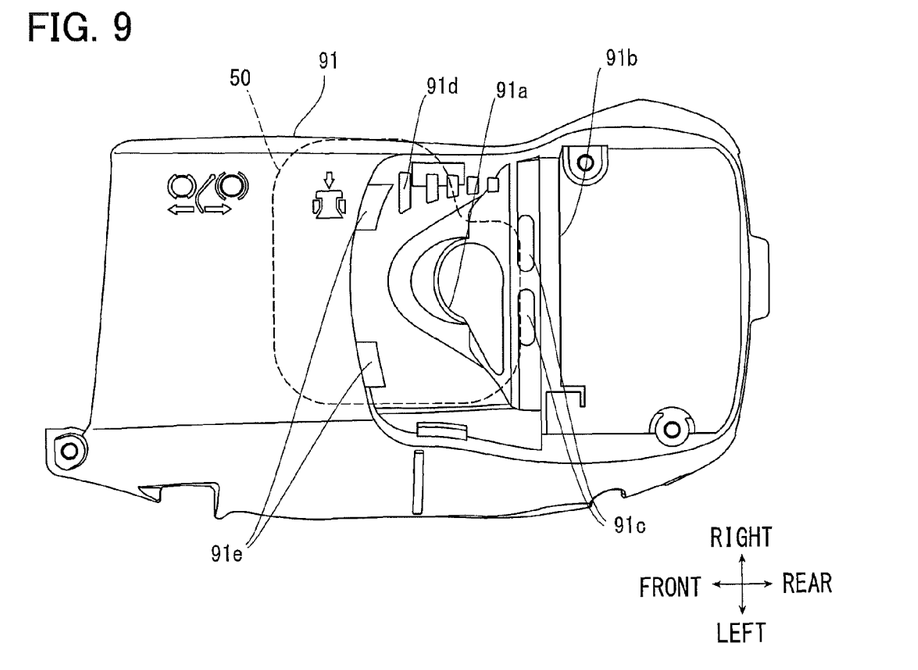
FIG. 9 is a plan view of a cylinder cover of the chainsaw according to the embodiment.

As shown in FIG. 9, the cylinder cover 91 is also formed with a hole 91a at a position above the spark plug 55 for receiving the spark plug 55. The spark plug 55 penetrates the hole 91a and protrudes out from the cylinder cover 91. An opening 91b is formed in the cylinder cover 91 at a position above the carburetor chamber 43a. The air intake 62 is exposed on the outside of the cylinder cover 91 through the opening 91b. Elongate holes 91c are formed in the cylinder cover 91 in a region rearward of the hole 91a, forward of the partitioning plate 91A, and above the intake pipe 53. The two elongate holes 91c are juxtaposed in the left-right direction and elongated in the same direction. A plurality of slits 91d is formed in the cylinder cover 91 on the right side of the hole 91a. A pair of fixing holes 91e is formed on the front side of the hole 91a. The fixing holes 91e are aligned in the left-right direction and serve to receive insertion of pawls 92A described later.

Figure 10:
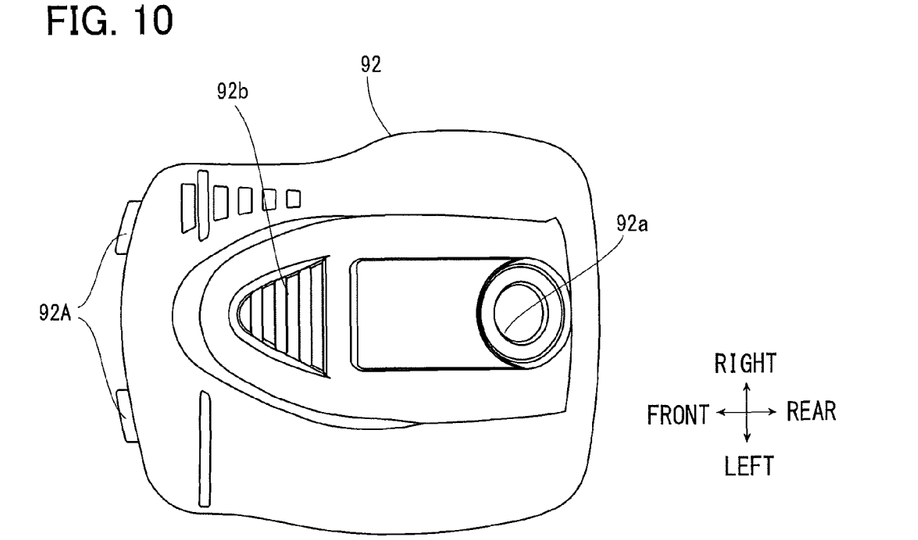
FIG. 10 is a plan view of a cleaner cover of the chainsaw according to the embodiment.

The cleaner cover 92 is disposed on the cylinder cover 91 and is primarily configured to cover the spark plug 55 protruding out from the cylinder cover 91, and the air intake 62 exposed in the cylinder cover 91. As shown in FIG. 10, a pair of pawls 92A are formed on the front edge of the cleaner cover 92, and a screw hole 92a is formed near the rear edge of the same. A screw 92B (see FIG. 3) is inserted into the screw hole 92a. After inserting the pawls 92A into the fixing holes 91e (see FIG. 9), the cleaner cover 92 is fixed on the cylinder cover 91 by inserting the screw 92B through the screw hole 92a and screwing the screw 92B into the screw hole 62a, as shown in FIG. 3.

A venthole 92b is formed in the cleaner cover 92 above the spark plug 55 and elongate holes 91c, as also shown in FIG. 3. The venthole 92b is configured of a plurality of ribs that are staggered in a side view. By providing the venthole 92b in this staggered arrangement, the interior of the engine chamber 90a cannot be seen from outside the cleaner cover 92, and woodchips and the like are restrained from entering the engine chamber 90a through the venthole 92b. Further, staggering the ribs constituting the venthole 92b at different levels reduces the amount of airflow generated by the fan 71 that flows out through the venthole 92b above the cylinder cover 91, enabling the fan 71 to more reliably cool the cylinder unit 50. The venthole 92b and elongate holes 91c correspond to a claimed first engine chamber venthole.

To cut wood or the like with the chainsaw 1 having the above structure, the operator starts the engine section 30, which rotates the crankshaft 44 and drives the saw chain 2 via the centrifugal clutch 81. At this time, the fan 71 rotates together with the crankshaft 44, and the airflow generated by the rotating fan 71 cools the cylinder unit 50 in the engine chamber 90a. This cooling action suppresses heat generated by the cylinder unit 50 from being transmitted to the carburetor 61.

However, the fan 71 does not rotate once the cutting operation is completed and the engine section 30 is halted. Since the heat generated by the cylinder unit 50 remains trapped in the engine chamber 90a, there is some danger that the heat could be transmitted to the carburetor 61 via the intake pipe 53. Further, since liquid gasoline has accumulated in the chamber (not shown) in the carburetor 61, it is possible that the gasoline in the chamber could reach the boiling point and vaporize. Since the carburetor 61 generates a fuel mixture by spraying liquid gasoline from the nozzle (not shown) as a mist, a proper mixture cannot be produced when the gasoline has vaporized and, hence, the engine section 30 may not start when the operator attempts to do so.

However, in the present invention, the first engine chamber venthole (i.e., the elongate holes 91c and venthole 92b) and the second engine chamber venthole 42c are formed respectively above and below the engine chamber 90a, and more specifically above and below the intake pipe 53. Accordingly, heated air in the engine chamber 90a is released into the atmosphere through the first engine chamber venthole, while cool air flows into the engine chamber 90a through the second engine chamber venthole 42c, thereby cooling the intake pipe 53 serving as a conduit for heat between the cylinder unit 50 and carburetor 61 and, hence, cooling the cylinder unit 50.

This configuration can reduce the amount of heat transmitted to the carburetor 61, thereby suppressing the vaporization of gasoline in the chamber of the carburetor 61. Further, since the first engine chamber venthole (the elongate holes 91c and venthole 92b) and the second engine chamber venthole 42c are aligned substantially along the vertical direction (the direction in which the cylinder unit 50 and the crankcase part 42 are arranged), the cooling effect is further enhanced by generating a continuous (linear) flow of air from the second engine chamber venthole 42c to the first engine chamber venthole (through the engine chamber 90a).

Further, since the first carburetor chamber venthole 43d and second carburetor chamber ventholes 46a are formed in the carburetor chamber 43a, air in the carburetor chamber 43a can circulate with the external air, suppressing a rise in temperature in the carburetor chamber 43a and suppressing an increase in temperature in the carburetor 61. Further, by positioning the carburetor 61 adjacent to the path from the first carburetor chamber venthole 43d to the second carburetor chamber ventholes 46a, cool air passes over the surface of the carburetor 61, cooling the carburetor 61 through natural heat dissipation.

Various modifications are conceivable.

For example, in the embodiment the engine section 30 is configured vertically, i.e., the direction from the cylinder unit 50 to the crankcase part 42 is aligned with the vertical. Accordingly, the first engine chamber venthole and the second engine chamber venthole 42c are aligned vertically. However, if the engine section 30 were arranged horizontally such that the direction from the cylinder unit 50 to the crankcase part 42 intersects the vertical, then the first and second engine chamber ventholes need not be aligned with the direction from the cylinder unit 50 to the crankcase part 42, but may be aligned in a direction best-suited to allow heat to escape, which is generally the vertical direction.

Further, the crankcase part 42 is integrally provided on the engine case 40 in the depicted embodiment, but the crankcase and the engine case may be configured independently.

While the present invention has been described in detail with reference to the embodiment thereof, it would be apparent to those skilled in the art that various changes and modifications may be made therein without departing from the spirit of the present invention.

What is claimed is:

1. A chainsaw comprising:
    an engine unit configured to generate a driving force, the engine unit comprising:
        a cylinder unit housing a piston therein;
        a crankshaft configured to be driven by the piston and extending in an axial direction; and
        a crank case configured to support the cylinder unit and house the crankshaft therein;
    a fuel supplying device configured to supply fuel to the engine unit;
    an intake pipe connecting the engine unit and the fuel supplying device; and
    an engine chamber defining portion defining an engine chamber therein for accommodating the cylinder unit, the engine chamber defining portion having a partitioning portion interposed between the cylinder unit and the fuel supplying device, the intake pipe penetrating the partitioning portion and being positioned within the engine chamber, the engine chamber defining portion being formed with a first engine chamber venthole and a second engine chamber venthole adjacent to the cylinder unit for achieving ventilation between the engine chamber and atmosphere, the engine chamber defining portion further including:
        an upper portion positioned above the cylinder unit in a vertical direction crossing the axial direction, the upper portion having an upper wall positioned above the intake pipe and opposing the intake pipe in the vertical direction, the first engine chamber venthole being formed in the upper wall and penetrating the upper wall in the vertical direction; and
        a lower portion having an opposing wall positioned below the intake pipe and opposing the intake pipe in the vertical direction, the opposing wall being integral with the crank case, the second engine chamber venthole being formed in the opposing wall to penetrate the opposing wall in the vertical direction and opposing the intake pipe in the vertical direction, the first engine chamber venthole and the second engine chamber venthole being in communication with the engine chamber to permit air to flow in the vertical direction within the engine chamber to cool the intake pipe.

2. The chainsaw according to claim 1, wherein the cylinder unit and the crank case are arranged in the vertical direction, the first engine chamber venthole and the second engine chamber venthole being aligned in a direction substantially parallel to the vertical direction.

3. The chainsaw according to claim 1, wherein the cylinder unit and the crank case are arranged in a prescribed direction crossing the vertical direction, the first engine chamber venthole and the second engine chamber venthole being aligned the vertical direction.

4. The chainsaw according to claim 1, wherein the first engine chamber venthole comprises a plurality of ribs that are arranged in a staggered manner.

5. The chainsaw according to claim 1, wherein the engine chamber defining portion further defines a fuel supplying device chamber therein for accommodating the fuel supplying device, the partitioning portion serving to partition between the engine chamber and the fuel supplying device chamber, and     wherein the engine chamber defining portion is further formed with a first fuel supplying device chamber venthole and a second fuel supplying device chamber venthole adjacent to the fuel supplying device for achieving ventilation between the fuel supplying device chamber and the atmosphere, the first fuel supplying device chamber venthole extending in the vertical direction.

6. The chainsaw according to claim 5, wherein the first fuel supplying device chamber venthole is covered by a wall section to prevent the first fuel supplying device chamber venthole from being visible from outside of the fuel supplying device chamber.

7. The chainsaw according to claim 1, wherein the engine unit further includes a fan fixed to one end of the crankshaft in the axial direction,     wherein the first engine chamber venthole is formed in the upper portion of the engine chamber defining portion at a position opposite to the fan with respect to the cylinder unit in the axial direction.

* * * * *